US010767567B2

(12) United States Patent
Lefebvre

(10) Patent No.: US 10,767,567 B2
(45) Date of Patent: *Sep. 8, 2020

(54) MULTI-SPOOL GAS TURBINE ENGINE ARCHITECTURE

(71) Applicant: PRATT & WHITNEY CANADA CORP., Longueuil (CA)

(72) Inventor: Guy Lefebvre, St-Bruno-de-Montarville (CA)

(73) Assignee: PRATT & WHITNEY CANADA CORP., Longueuil, QC (CA)

(*) Notice: Subject to any disclaimer, the term of this patent is extended or adjusted under 35 U.S.C. 154(b) by 500 days.

This patent is subject to a terminal disclaimer.

(21) Appl. No.: 15/407,445

(22) Filed: Jan. 17, 2017

(65) Prior Publication Data
US 2018/0023480 A1 Jan. 25, 2018

Related U.S. Application Data

(60) Provisional application No. 62/363,956, filed on Jul. 19, 2016, provisional application No. 62/363,955, (Continued)

(51) Int. Cl.
F02C 7/36 (2006.01)
B64D 35/04 (2006.01)
(Continued)

(52) U.S. Cl.
CPC ............ F02C 7/36 (2013.01); B64D 27/10 (2013.01); B64D 35/04 (2013.01); F01D 5/026 (2013.01);
(Continued)

(58) Field of Classification Search
CPC ...... F02C 7/32; F02C 7/36; F02C 3/08; F02C 3/107; F02C 3/113; F02C 3/145;
(Continued)

(56) References Cited

U.S. PATENT DOCUMENTS 2,548,975 A 4/1951 Hawthorne
2,747,367 A 5/1956 Savin
(Continued)

FOREIGN PATENT DOCUMENTS

CA 2562290 C 10/2013
CA 2970386 1/2018
(Continued)

OTHER PUBLICATIONS

European Search Report in relating EP application No. 18154161.6.
(Continued)

Primary Examiner — Christopher Verdier
Assistant Examiner — Jesse M Prager
(74) Attorney, Agent, or Firm — Norton Rose Fulbright Canada LLP

(57) ABSTRACT

A multi-spool gas turbine engine comprises a low pressure (LP) spool and a high pressure (HP) spool. The LP spool and the HP spool are independently rotatable about an axis. The LP pressure spool has an LP compressor and an LP turbine. The HP spool has an HP turbine and an HP compressor. An accessory gear box (AGB) is axially mounted at one end of the engine. The LP compressor is axially positioned between the HP compressor and the AGB. The AGB is drivingly connected to the HP spool through the center of the LP compressor.

18 Claims, 3 Drawing Sheets

US 10,767,567 B2
Page 2

Related U.S. Application Data filed on Jul. 19, 2016, provisional application No. 62/363,952, filed on Jul. 19, 2016, provisional application No. 62/363,949, filed on Jul. 19, 2016, provisional application No. 62/363,947, filed on Jul. 19, 2016.

(51) Int. Cl.

| | | |
|---|---|---|
| *F02C 3/08* | (2006.01) | |
| *F01D 5/02* | (2006.01) | |
| *F02C 3/14* | (2006.01) | |
| *F02C 6/20* | (2006.01) | |
| *F02C 3/113* | (2006.01) | |
| *B64D 27/10* | (2006.01) | |
| *F01D 15/12* | (2006.01) | |
| *F02C 3/10* | (2006.01) | |
| *F02K 3/06* | (2006.01) | |
| *F01D 25/18* | (2006.01) | |
| *F02C 7/32* | (2006.01) | |
| *F16H 57/04* | (2010.01) | |
| *F02C 3/107* | (2006.01) | |

(52) U.S. Cl.
CPC .............. *F01D 15/12* (2013.01); *F01D 25/18* (2013.01); *F02C 3/08* (2013.01); *F02C 3/10* (2013.01); *F02C 3/107* (2013.01); *F02C 3/113* (2013.01); *F02C 3/145* (2013.01); *F02C 6/206* (2013.01); *F02C 7/32* (2013.01); *F02K 3/06* (2013.01); *F16H 57/0495* (2013.01); *F05D 2220/32* (2013.01); *F05D 2220/323* (2013.01); *F05D 2220/324* (2013.01); *F05D 2220/329* (2013.01); *F05D 2230/70* (2013.01); *F05D 2230/72* (2013.01); *F05D 2240/61* (2013.01); *F05D 2250/36* (2013.01); *F05D 2260/31* (2013.01); *F05D 2260/36* (2013.01); *F05D 2260/40* (2013.01); *F05D 2260/4031* (2013.01); *F05D 2260/40311* (2013.01); *F05D 2260/98* (2013.01); *Y02T 50/671* (2013.01)

(58) Field of Classification Search
CPC .. F02C 3/16; F02C 6/206; F01D 5/026; F01D 5/12; F01D 25/18; F01D 2260/98; F01D 2240/61; F01D 2260/36; F01D 2260/40; F01D 2260/403; F01D 2260/40311; F01D 2230/72; F01D 2250/36; F01D 2220/32; F01D 2220/323; F01D 2220/324; F01D 2220/329; B64D 35/04; B64D 27/10; F02K 3/06; F16H 57/0495; Y02T 50/671; F05D 2260/31

See application file for complete search history.

(56) References Cited

U.S. PATENT DOCUMENTS

| | | | |
|---|---|---|---|
| 2,929,207 | A | 3/1960 | Peterson |
| 2,955,424 | A | 10/1960 | Hryniszak |
| 2,984,977 | A | 5/1961 | Embree |
| 3,152,443 | A | 10/1964 | Newland |
| 3,170,292 | A | 2/1965 | Howes |
| 3,204,406 | A | 9/1965 | Howes |
| 3,209,536 | A | 10/1965 | Howes |
| 3,255,825 | A | 6/1966 | Mouille et al. |
| 3,488,947 | A | 1/1970 | Miller |
| 3,529,419 | A | 9/1970 | Reed |
| 3,762,161 | A | 10/1973 | Pennig |
| 3,874,811 | A | 4/1975 | Dennison |
| 4,030,288 | A | 6/1977 | Davis |
| 4,055,949 | A | 11/1977 | Boudigues |
| 4,141,212 | A | 2/1979 | Koschier |
| 4,251,987 | A | 2/1981 | Adamson |
| 4,498,291 | A | 2/1985 | Jefferey |
| 4,531,694 | A | 7/1985 | Soloy |
| 4,611,464 | A | 9/1986 | Hetzer |
| 4,685,286 | A | 8/1987 | Hetzer et al. |
| 4,744,214 | A | 5/1988 | Monsarrat |
| 4,765,135 | A | 8/1988 | Lardellier |
| 4,815,282 | A | 3/1989 | Wilkinson et al. |
| 4,817,382 | A | 4/1989 | Rudolph et al. |
| 4,864,812 | A | 9/1989 | Rodgers |
| 4,934,140 | A | 6/1990 | Dennison |
| 5,119,624 | A | 6/1992 | McKenna |
| 5,159,808 | A | 11/1992 | Kast |
| 5,161,364 | A | 11/1992 | Bruun |
| 5,220,784 | A | 6/1993 | Wilcox |
| 5,309,708 | A | 5/1994 | Stewart |
| 5,473,883 | A | 12/1995 | Naudet |
| 6,041,589 | A | 3/2000 | Giffin, III et al. |
| 6,082,967 | A | 7/2000 | Loisy |
| 6,247,668 | B1 | 6/2001 | Reysa |
| 6,606,863 | B2 | 8/2003 | Napier |
| 6,735,954 | B2 | 5/2004 | MacFarlane et al. |
| 6,855,089 | B2 | 2/2005 | Poulin |
| 6,865,891 | B2 | 3/2005 | Walsh et al. |
| 6,895,741 | B2 | 5/2005 | Rago et al. |
| 6,901,759 | B2 | 6/2005 | Frutschi |
| 7,055,303 | B2 | 6/2006 | Macfarlane et al. |
| 7,144,349 | B2 | 12/2006 | Mitrovic |
| 7,168,913 | B2 | 1/2007 | Lardellier |
| 7,500,365 | B2 | 3/2009 | Suciu et al. |
| 7,552,591 | B2 | 6/2009 | Bart |
| 7,690,185 | B2 | 4/2010 | Linet et al. |
| 7,698,884 | B2 | 4/2010 | Maguire et al. |
| 7,707,909 | B2 | 5/2010 | Linet et al. |
| 7,758,302 | B2 | 7/2010 | Linet et al. |
| 7,762,084 | B2 | 7/2010 | Martis |
| 8,176,725 | B2 | 5/2012 | Norris |
| 8,209,952 | B2 | 7/2012 | Ress, Jr. |
| 8,220,245 | B1 | 7/2012 | Papandreas |
| 8,350,398 | B2 | 1/2013 | Butt |
| 8,459,038 | B1 | 6/2013 | Lickfold et al. |
| 8,464,511 | B1 | 6/2013 | Ribarov et al. |
| 8,500,583 | B2 | 8/2013 | Goi et al. |
| 8,516,789 | B2 | 8/2013 | Kupratis |
| 8,568,089 | B2 | 10/2013 | Lemmers, Jr. et al. |
| 8,621,871 | B2 | 1/2014 | McCune et al. |
| 8,689,538 | B2 | 4/2014 | Sankrithi |
| 8,794,922 | B2 | 8/2014 | Bart et al. |
| 8,845,292 | B2 | 9/2014 | Lafont |
| 8,853,878 | B1 | 10/2014 | White |
| 9,062,611 | B2 | 6/2015 | Sheridan |
| 9,126,691 | B2 | 9/2015 | Cloft |
| 9,145,834 | B2 | 9/2015 | Frost et al. |
| 9,239,004 | B2 | 1/2016 | Kupratis |
| 9,297,305 | B2 | 3/2016 | Drachsler et al. |
| 9,322,341 | B2 | 4/2016 | Belleville |
| 9,328,667 | B2 | 5/2016 | MacFarlane |
| 9,341,121 | B2 | 5/2016 | Kupratis |
| 9,353,848 | B2 | 5/2016 | Blewett et al. |
| 9,512,784 | B2 | 12/2016 | Morgan et al. |
| 9,828,911 | B2 | 1/2017 | Burghardt |
| 9,719,465 | B2 | 8/2017 | Suciu |
| 9,745,860 | B1 | 8/2017 | Haskin |
| 9,752,500 | B2 | 9/2017 | Ullyott |
| 9,752,610 | B2 | 9/2017 | Rousseau |
| 9,784,182 | B2 | 10/2017 | Dhanuka |
| 9,819,292 | B2 | 11/2017 | Thatcher |
| 9,890,704 | B2 | 2/2018 | Speak et al. |
| 9,926,849 | B2 | 3/2018 | Frost et al. |
| 9,932,858 | B2 | 4/2018 | Miller |
| 10,054,001 | B2 | 8/2018 | Beutin et al. |
| 10,072,570 | B2 | 9/2018 | Kupratis |
| 10,094,295 | B2 | 10/2018 | Ullyott et al. |
| 10,125,722 | B2 | 11/2018 | Kupratis |
| 10,132,198 | B2 | 11/2018 | Baba |
| 2003/0051483 | A1 | 3/2003 | Napier |
| 2004/0065091 | A1 | 4/2004 | Anderson |
| 2005/0060983 | A1 | 3/2005 | Lardellier |
| 2006/0010152 | A1 | 1/2006 | Catalano |

(56) References Cited

U.S. PATENT DOCUMENTS

| | | |
|---|---|---|
| 2006/0137355 A1 | 6/2006 | Welch et al. |
| 2007/0022735 A1 | 2/2007 | Henry |
| 2007/0240427 A1 | 10/2007 | Ullyott |
| 2008/0081733 A1 | 4/2008 | Hattenbach |
| 2008/0138195 A1 | 6/2008 | Kern |
| 2008/0148881 A1 | 6/2008 | Moniz et al. |
| 2009/0015011 A1 | 1/2009 | Colin |
| 2009/0188334 A1 | 7/2009 | Merry |
| 2009/0288421 A1 | 11/2009 | Zeiner |
| 2009/0322088 A1 | 12/2009 | Dooley |
| 2010/0164234 A1 | 7/2010 | Bowman |
| 2010/0180568 A1 | 7/2010 | Sachs |
| 2010/0212285 A1 | 8/2010 | Negulesou |
| 2010/0281875 A1 | 11/2010 | Price |
| 2011/0056183 A1 | 3/2011 | Sankrithi |
| 2011/0056208 A1 | 3/2011 | Norris |
| 2011/0171030 A1 | 7/2011 | Swift |
| 2011/0284328 A1 | 11/2011 | Brandt |
| 2013/0031912 A1 | 2/2013 | Finney |
| 2013/0056982 A1 | 3/2013 | Gozdawa |
| 2013/0098066 A1 | 4/2013 | Gallet |
| 2012/0121417 A1 | 6/2013 | Lafont |
| 2013/0139518 A1 | 6/2013 | Morgan |
| 2013/0145769 A1 | 6/2013 | Norris |
| 2013/0186058 A1 | 7/2013 | Sheridan |
| 2013/0255224 A1 | 10/2013 | Kupratis |
| 2014/0069107 A1 | 3/2014 | Macfarlane |
| 2014/0130352 A1 | 5/2014 | Buldtmann et al. |
| 2014/0150401 A1 | 6/2014 | Venter |
| 2014/0250862 A1 | 9/2014 | Suciu et al. |
| 2014/0252160 A1 | 9/2014 | Suciu et al. |
| 2014/0255147 A1 | 9/2014 | Root |
| 2014/0256494 A1* | 9/2014 | Lewis .................. F01D 25/18 475/159 |
| 2014/0260295 A1 | 9/2014 | Ullyott |
| 2014/0290265 A1 | 10/2014 | Ullyott et al. |
| 2014/0297155 A1* | 10/2014 | Chen .................. F02C 9/28 701/100 |
| 2015/0013307 A1 | 1/2015 | Burghardt |
| 2015/0167549 A1 | 6/2015 | Ribarov |
| 2015/0292544 A1 | 10/2015 | Rousseau |
| 2015/0337738 A1 | 11/2015 | Suciu |
| 2015/0369123 A1 | 12/2015 | Hanrahan |
| 2015/0377125 A1 | 12/2015 | Kupratis |
| 2016/0040601 A1 | 2/2016 | Frost |
| 2016/0090871 A1 | 3/2016 | Olsen |
| 2016/0169118 A1 | 6/2016 | Duoung |
| 2016/0201490 A1 | 7/2016 | Scott |
| 2016/0208690 A1 | 7/2016 | Zimmitti |
| 2016/0215694 A1 | 7/2016 | Brostmeyer |
| 2016/0230843 A1 | 8/2016 | Duong et al. |
| 2016/0245185 A1 | 8/2016 | Lamarre et al. |
| 2016/0290226 A1 | 10/2016 | Roberge |
| 2016/0305261 A1 | 10/2016 | Orosa |
| 2016/0319845 A1 | 11/2016 | Molnar |
| 2016/0333791 A1 | 11/2016 | Snyder et al. |
| 2016/0341214 A1 | 11/2016 | O'Toole |
| 2016/0363055 A1 | 12/2016 | Edwards |
| 2017/0108084 A1 | 4/2017 | Chmylkowski |
| 2017/0122122 A1 | 5/2017 | Lepretre |
| 2017/0191381 A1 | 7/2017 | Baba |
| 2017/0211477 A1 | 7/2017 | Menheere |
| 2017/0211484 A1 | 7/2017 | Sheridan |
| 2017/0306841 A1 | 10/2017 | Skertic |
| 2017/0314469 A1 | 11/2017 | Roever |
| 2017/0314474 A1 | 11/2017 | Wotzak |
| 2017/0327241 A1 | 11/2017 | Mitrovic |
| 2017/0356347 A1 | 12/2017 | Scothern et al. |
| 2017/0356452 A1 | 12/2017 | Mastro |
| 2017/0370284 A1 | 12/2017 | Harvey |
| 2018/0016989 A1 | 1/2018 | Abe |
| 2018/0023481 A1 | 1/2018 | Lefebvre |
| 2018/0023482 A1 | 1/2018 | Lefebvre |
| 2018/0045068 A1 | 2/2018 | Brinson et al. |
| 2018/0058330 A1 | 3/2018 | Munevar |
| 2018/0073428 A1 | 3/2018 | Morgan |
| 2018/0073429 A1 | 3/2018 | Dubreuil |
| 2018/0073438 A1 | 3/2018 | Durocher et al. |
| 2018/0135522 A1 | 5/2018 | Mitrovic et al. |
| 2018/0149091 A1 | 5/2018 | Howell et al. |
| 2018/0163640 A1 | 6/2018 | Dubreuil et al. |
| 2018/0171815 A1 | 6/2018 | Suciu et al. |
| 2018/0172012 A1 | 6/2018 | Plante et al. |
| 2018/0202310 A1 | 7/2018 | Suciu et al. |
| 2018/0202368 A1 | 7/2018 | Suciu et al. |
| 2018/0208322 A1 | 7/2018 | Tantot |
| 2018/0216525 A1 | 8/2018 | Plante et al. |
| 2018/0223739 A1 | 8/2018 | Dubreuil et al. |
| 2018/0283281 A1 | 10/2018 | Veilleux, Jr. et al. |
| 2018/0291817 A1 | 10/2018 | Suciu et al. |
| 2018/0313274 A1 | 11/2018 | Suciu et al. |
| 2018/0347471 A1 | 12/2018 | Wotzak |

FOREIGN PATENT DOCUMENTS

| | | |
|---|---|---|
| CA | 2970389 | 1/2018 |
| CA | 2975558 | 6/2018 |
| EP | 0103370 | 3/1984 |
| EP | 0860593 B1 | 9/2003 |
| EP | 1908938 | 4/2004 |
| EP | 2226487 | 9/2010 |
| EP | 2295763 | 3/2011 |
| EP | 2295763 A2 | 3/2011 |
| EP | 2320067 | 5/2011 |
| EP | 1959114 B1 | 5/2012 |
| EP | 2728140 | 5/2014 |
| EP | 2728140 A2 | 5/2014 |
| EP | 3032073 A1 | 6/2016 |
| EP | 3043056 | 7/2016 |
| EP | 3273031 | 1/2018 |
| EP | 3273034 | 1/2018 |
| EP | 3273032 | 4/2018 |
| EP | 3309371 | 4/2018 |
| FR | 991975 | 10/1951 |
| FR | 1262452 | 5/1961 |
| FR | 1594317 | 6/1970 |
| GB | 713839 | 8/1954 |
| GB | 1102591 | 2/1968 |
| WO | WO95/02120 A1 | 1/1995 |
| WO | 2005/061873 | 7/2005 |
| WO | WO200845068 | 4/2008 |
| WO | WO201533336 | 3/2015 |
| WO | 20150122948 | 8/2015 |
| WO | WO2015122948 | 8/2015 |
| WO | WO2017/198999 | 11/2017 |

OTHER PUBLICATIONS

European Search Report dated May 25, 2018 in related EP application No. 17191309.8.

European Search Report dated May 25, 2018 in related EP application No. 17186249.3.

European Search Report dated Nov. 30, 2017 in counterpart EP application No. 17182102.8.

European Search Report dated Dec. 12, 2017 in related EP application No. 17182076.4.

European Search Report dated Dec. 12, 2017 in related EP application No. 17182096.2.

European Search Report dated Jan. 31, 2018 in related EP application No. 17185796.4.

A New Approach to Turboshaft Engine Growth, M. A. Compagnon, General Electric Company, Lynn, Massachusetts pp. 80-41-1 to 80-41-6, May 13, 1980.

U.S. Appl. No. 15/384,959, filed Dec. 20, 2016.

European Search Report dated Mar. 19, 2018 in related EP application No. 17182087.1.

European Search Report dated Mar. 21, 2018 in related EP application No. 17182094.7.

European Search Report dated Apr. 6, 2018 in related EP application No. 17193893.9.

(56) References Cited

OTHER PUBLICATIONS

United Training Corp., PT6 Descriptive Course and Guide to Troubleshooting, Dec. 2016, Pub: United Training Corp., pp. 1-6 (Year: 2016).

Flight International, PT6: Turboprop Phenomenon, Jan. 31-Feb. 6, 1990, Reed Business Publishing Ltd, pp. 32-36. (Year: 1990).

Guy Norris, GE Takes on PT6 Engine With Advanced Turboprop, Nov. 17, 2015, Aviation Week Intelligence Network, pp. 1-3 (Year: 2015).

European Search Report issued in corresponding EP application No. 19193794.5 dated Jan. 3, 2020.

\* cited by examiner

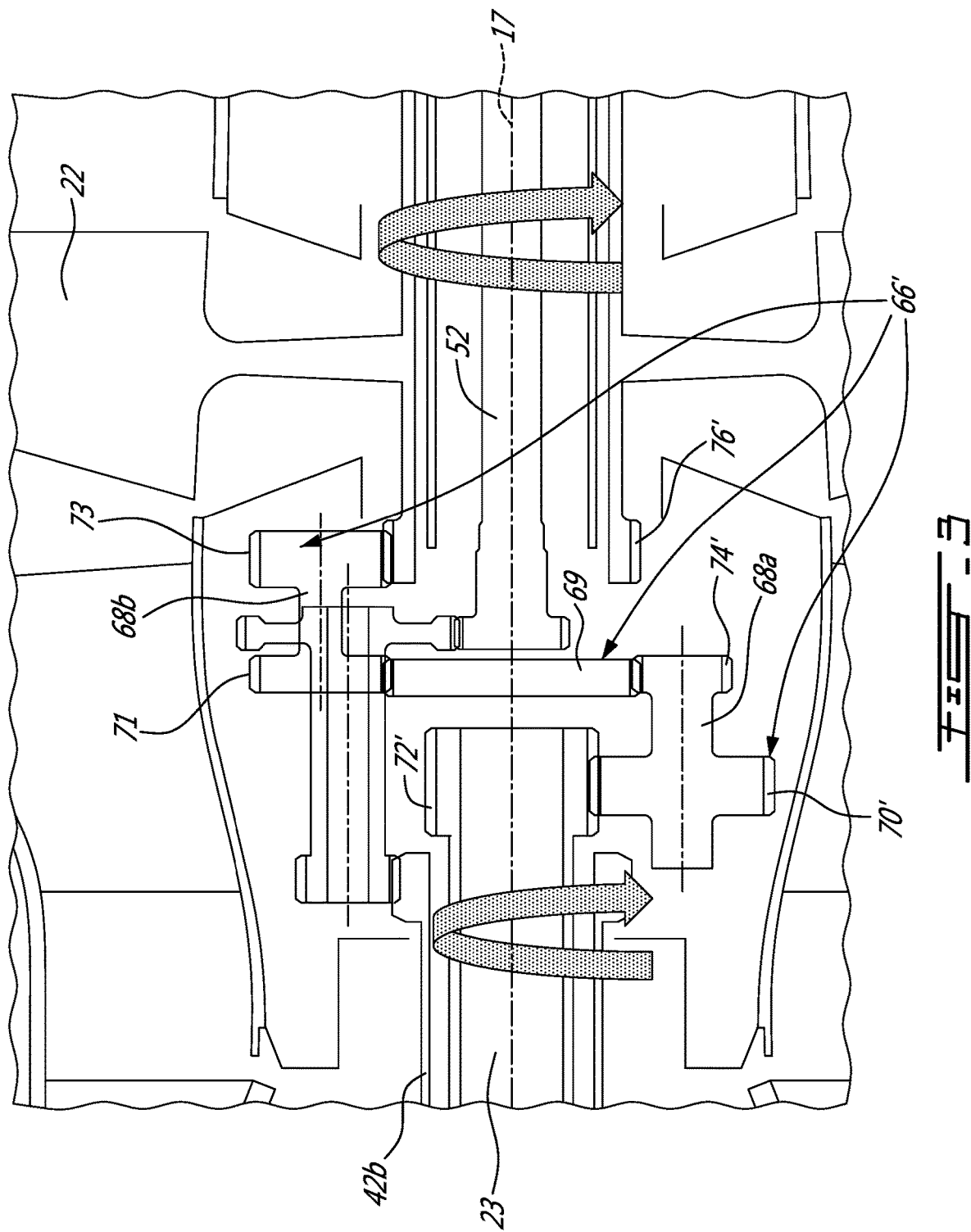

MULTI-SPOOL GAS TURBINE ENGINE ARCHITECTURE

CROSS-REFERENCE TO RELATED APPLICATIONS

This application claims priority from U.S. provisional patent application Nos. 62/363,956, filed Jul. 19, 2016, 62/363,955, filed Jul. 19, 2016; 62/363,952 filed Jul. 19, 2016; 62/363,949 filed Jul. 19, 2016; 62/363,947 filed Jul. 19, 2016 and U.S. application Ser. No. 15/266,321 filed Sep. 15, 2016, the entire contents of each of which are incorporated by reference herein.

TECHNICAL FIELD

The application relates generally to gas turbine engines and, more particularly, to a multi-spool engine architecture.

BACKGROUND OF THE ART

Gas turbine engines are subject to continued improvements. For instance, there is continuing need to improve the thermodynamic cycle performance of engines while providing for compact and lightweight engine installations.

SUMMARY

In one aspect, there is provided a multi-spool gas turbine engine comprising: a low pressure (LP) spool; a high pressure (HP) spool, the LP spool and the HP spool being independently rotatable about a central axis, the LP pressure spool comprising an LP compressor and an LP turbine, the HP spool comprising an HP turbine and an HP compressor; and an accessory gear box (AGB) mounted in axial series at one end of the engine, the LP compressor being axially positioned between the HP compressor and the AGB, the AGB being drivingly connected to the HP spool through the center of the LP compressor.

In another aspect, there is provided a multi-spool gas turbine engine comprising: a low pressure (LP) spool; a high pressure (HP) spool; the LP spool and the HP spool being mounted for rotation about a central axis; the LP pressure spool comprising an LP compressor and an LP turbine, the HP spool comprising an HP turbine and an HP compressor; and an accessory gear box (AGB) drivingly connected to the HP spool, the LP compressor being axially positioned between the HP compressor and the AGB and drivingly connected to the LP turbine via a gear train.

In a further aspect, there is provided a turboprop or turboshaft engine comprising: an output drive shaft configured to drivingly engage a rotatable load; a low pressure (LP) spool comprising an LP turbine and an LP compressor, the output drive shaft being drivingly connected to the LP turbine, the LP compressor being drivingly connected to the LP turbine via a first gear train; a high pressure (HP) spool rotatable independently of the LP spool, and an accessory gearbox (AGB) drivingly connected to the HP compressor, the LP compressor being positioned axially between the AGB and the HP compressor, and wherein the AGB has an input axis coaxial to a centerline of the LP compressor.

In a still further aspect, there is provided a reverse flow gas turbine engine, comprising: an output drive shaft having a front end configurable to drivingly engage a rotatable load; a low pressure (LP) spool including an LP turbine drivingly engaged to the output drive shaft, and an LP compressor drivingly connected to the LP turbine via a gear train, the LP turbine disposed forward of the LP compressor relative to a front end of the output drive shaft; and a high pressure HP spool including an HP turbine and an HP compressor drivingly engaged to an HP shaft rotatable independently of the LP spool, the HP compressor disposed forward of the LP compressor and in fluid communication therewith, and the HP turbine disposed aft of the LP turbine and in fluid communication therewith.

DESCRIPTION OF THE DRAWINGS

Reference is now made to the accompanying figures in which:

FIG. 3 is an enlarged cross-section view similar to FIG. 2 but illustrating another possible gear arrangement between the LP shaft and the LP compressor.

DETAILED DESCRIPTION

Figure 1:
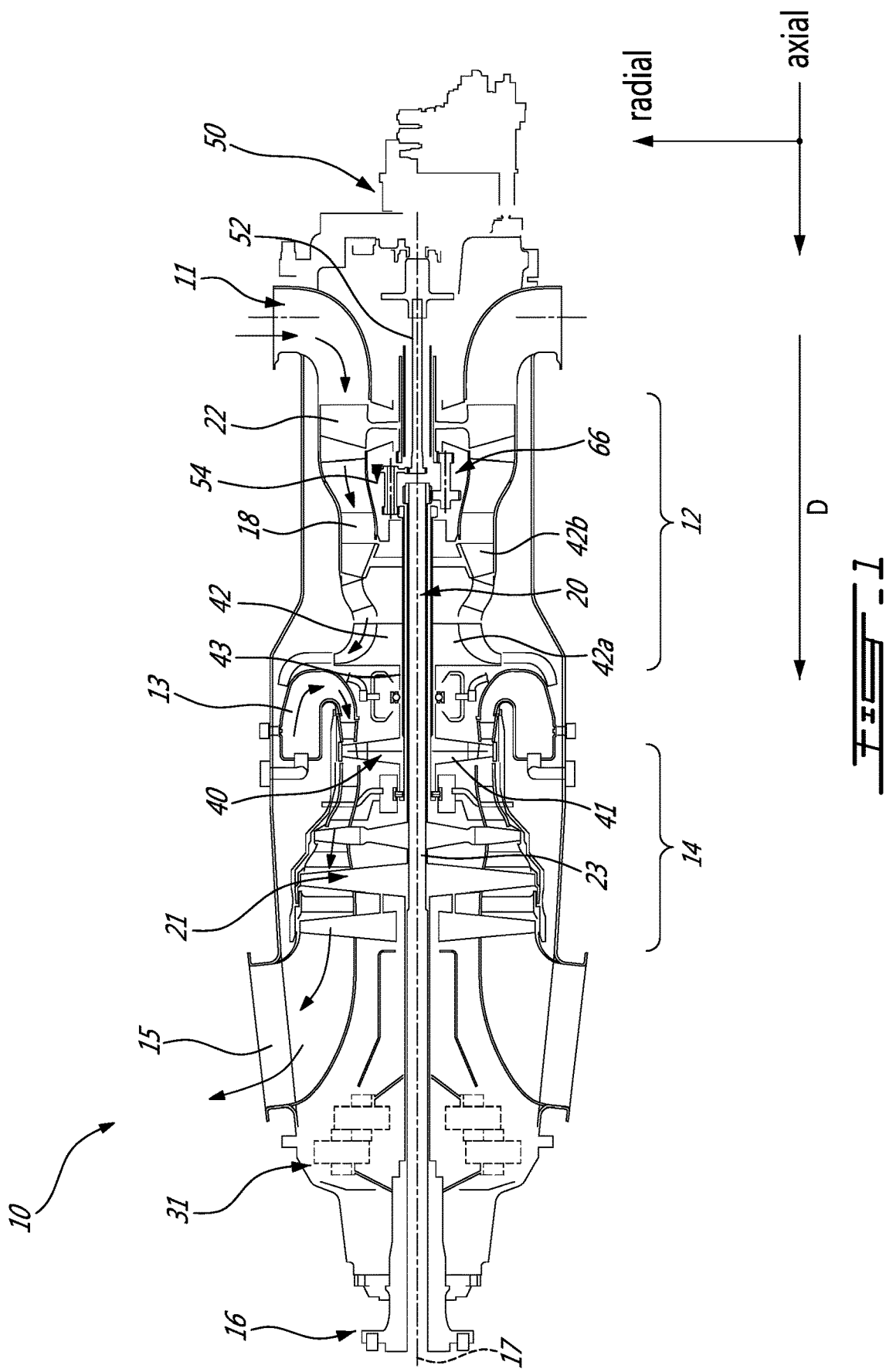
FIG. 1 is a schematic cross-sectional view of a multi-spool gas turbine engine.

FIG. 1 illustrates a gas turbine engine 10 of a type preferably provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, an exhaust outlet 15 through which the combustion gases exit the engine 10. The engine 10 further has a drive output shaft 16 having a front end configured to drive a rotatable load (not shown). The rotatable load can, for instance, take the form of a propeller or a rotor, such as a helicopter main rotor. Depending on the intended use, the engine 10 can be configured as a turboprop engine or a turboshaft engine. FIG. 1 illustrates a turboprop configuration. The gas turbine engine 10 has a centerline or longitudinal center axis 17 about which the compressor and turbine rotors rotate.

The gas turbine engine 10 has an axially extending central core which defines a gaspath 18 through which gases flow, as depicted by flow arrows in FIG. 1. The exemplary embodiment shown in FIG. 1 is a "reverse-flow" engine because gases flow through the gaspath 18 from the air inlet 11 at a rear portion thereof, to the exhaust outlet 15 at a front portion thereof. This is in contrast to "through-flow" gas turbine engines in which gases flow through the core of the engine from a front portion to a rear portion. The direction of the flow of gases through the gaspath 18 of the engine 10 disclosed herein can be better appreciated by considering that the gases flow through the gaspath 18 in the same direction D as the one along which an aircraft engine travels during flight. Stated differently, gases flow through the engine 10 from a rear end thereof towards the output shaft 16.

It will thus be appreciated that the expressions "forward" and "aft" used herein refer to the relative disposition of components of the engine 10, in correspondence to the "forward" and "aft" directions of the engine 10 and aircraft including the engine 10 as defined with respect to the direction of travel. In the embodiment shown, a component of the engine 10 that is "forward" of another component is arranged within the engine 10 such that it is located closer to output shaft 16 (e.g. closer to the propeller in a turboprop application). Similarly, a component of the engine 10 that is "aft" of another component is arranged within the engine 10 such that it is further away from the output shaft 16.

Still referring to FIG. 1, the engine 10 has multiple spools which perform compression to pressurize the air received through the air inlet 11, and which extract energy from the combustion gases before they exit the gaspath 18 via the exhaust outlet 15. More particularly, the illustrated embodiment comprises a low pressure (LP) spool 20 and a high pressure (HP) spool 40 mounted for rotation about the engine central axis. The LP and HP spools 20, 40 are independently rotatable about the central axis 17. The term "spool" is herein intended to broadly refer to drivingly connected turbine and compressor rotors and is, thus, not limited to a compressor and turbine assembly on a single shaft. As will be seen hereinbelow, it also includes a rotary assembly with multiple shafts geared together.

The LP spool 20 includes at least one component to compress the air that is part of the compressor section 12, and at least one component to extract energy from the combustion gases that is part of the turbine section 14. More particularly, the LP spool 20 has a low pressure turbine 21, also known as a power turbine, which may include different number of stages (three stages in the illustrated embodiment), and which drives an LP compressor 22 (also referred to as a boost). The low pressure turbine 21 drives the low pressure compressor 22, thereby causing the LP compressor 22 to pressurize incoming air from the air inlet 11. The LP compressor 22 is disposed just forward of the air inlet 11. Both the LP turbine 21 and the LP compressor 22 are disposed along the center axis 17. In the depicted embodiment, both the LP turbine 21 and the LP compressor 22 include rotatable components having an axis of rotation that is coaxial with the center axis 17. It is understood that they can each include one or more stages depending upon the desired engine thermodynamic cycle.

The LP turbine 21 is forward of the LP compressor 22. The LP turbine 21 is also aft of the exhaust outlet 15. The LP compressor 22 is forward of the air inlet 11. This arrangement of the LP turbine 21 and the LP compressor 22 provides for a reverse-flow engine 10 that has one or more LP compressor stages located at the rear of the engine 10, and which are driven by one or more low pressure turbine stages located at the front of the engine 10.

The LP spool 20 further comprises an LP shaft 23 (also known as a power shaft) coaxial with the center axis 17 of the engine 10. The LP turbine 21 is drivingly connected to the LP shaft 23. The LP shaft 23 allows the LP turbine 21 to drive the LP compressor 22 during operation of the engine 10. As will be discussed in greater details hereinbelow, the LP shaft 23 may be drivingly connected to the LP compressor 22 via a gear train to allow the LP compressor 22 to run at a different rotational speed from the LP turbine 21. This can provide more flexibility in the selection of design points for the LP compressor 22 while at the same time allowing to drivingly connect an axially mounted accessory gear box (AGB) to the HP spool 40 centrally through the LP compressor 22, thereby minimizing the engine envelope in a direction radial from the engine axis 17.

It is understood that the LP shaft 23 is not limited to the configuration depicted in FIG. 1. For instance, instead of being provided in the form of a one piece through shaft, it could be divided into serially interconnectable sections. Splines or other suitable shaft connections could be provided between adjacent shaft sections to transfer torque from the LP turbine 21.

Still referring to FIG. 1, it can be appreciated that the LP shaft 23 also extends axially forwardly from the LP turbine 21 for driving the output shaft 16. The LP shaft 23 is drivingly connected to the output shaft 16 via a suitable reduction gear box (RGB) 31. A rotatable load, a propeller (not shown) according to the illustrated example, is connectable to a front end of the output shaft 16. In this way, the LP turbine 21 can be used to drive the rotatable load (e.g. the propeller) at a reduced speed relative to the speed of the LP turbine 21. In such a configuration, during operation of the engine 10, the LP turbine 21 drives the rotatable load such that a rotational drive produced by the LP turbine 21 is transferred to the rotatable load via the LP shaft 23, the RGB 31 and the output shaft 16 coming out forwardly from the RGB 31. The rotatable load can therefore be any suitable component, or any combination of suitable components, that is capable of receiving the rotational drive from the LP turbine section 21.

The RGB 31 processes and outputs the rotational drive transferred thereto from the LP turbine 21 via the LP shaft 23 through known gear reduction techniques. The RGB 31 allows for the load (e.g. the propeller according to the illustrated turboprop example) to be driven at its optimal rotational speed, which is different from the rotational speed of the LP turbine 21. The RGB 31 is axially mounted at the front end of the engine. The RGB 31 has an input and an output axis parallel (coaxial in the illustrated embodiment) to the central axis 17 of the engine 10.

In an alternate embodiment where the engine 10 is a turboshaft, the rotational load (which may include, but is not limited to, helicopter main rotor(s) and/or tail rotor(s), propeller(s) for a tilt-rotor aircraft, pump(s), generator(s), gas compressor(s), marine propeller(s), etc.) is driven by the LP turbine 21 via the RGB 31, or the RGB 31 may be omitted such that the output of the engine 10 is provided directly by the LP shaft 23.

The LP shaft 23 with the portions thereof extending forward and aft of the LP turbine 21 provides the engine 10 with bidirectional drive. Modularity criteria for gas turbine engines may require the use of distinct shaft sections in opposed axial directions from the LP turbine 21. The LP shaft sections may be directly or indirectly connected together. Alternately, the LP shaft 23 can be integral with a first segment of the LP shaft extending axially between the LP compressor 22 and the LP turbine 21, and a second segment extending between the rotatable load and the LP turbine 21. Whether the LP shaft 23 is integral or segmented, the LP turbine 21 provides rotational drive outputted at each end of the LP shaft 23.

In light of the preceding, it can be appreciated that the LP turbine 21 drives both the rotatable load and the LP compressor 22. Furthermore, the rotatable load, when mounted to the engine 10, and the LP compressor 22 are disposed on opposite ends of the LP turbine 21. It can thus be appreciated that one or more low pressure turbine stages are used to drive elements in front of the LP turbine (e.g. propeller, RGB 31, etc.) as well as to drive elements to the rear of the LP turbine (e.g. LP compressor 22). This configuration of the LP turbine 21 allows it to simultaneously drive the rotatable load and the LP compressor 22.

Still referring to FIG. 1, the HP spool 40 has at least one component to compress the air that is part of the compressor section 12, and at least one component to extract energy from the combustion gases that is part of the turbine section 14. The HP spool 40 is also disposed along the center axis 17 and includes an HP turbine 41 (also referred to as the compressor turbine) drivingly engaged (e.g. directly connected) to an HP compressor 42 by an HP shaft 43 rotating independently of the LP shaft 23. In the illustrated embodiment, the HP shaft 43 is a hollow shaft which rotates around the LP shaft 23. That is the LP shaft 23 extends axially through the HP shaft 43. Similarly to the LP turbine 21 and the LP compressor 22, the HP turbine 41 and the HP compressor 42 can each include one or more stages of rotors, depending upon the desired engine thermodynamic cycle, for example. In the depicted embodiment, the HP compressor 42 includes a centrifugal compressor 42a or impeller and an axial compressor 42b, both of which are driven by the HP turbine 41. During operation of the engine 10, torque is transferred from HP turbine 41 to the HP compressor 42 via HP shaft 43.

In the illustrated reverse flow engine configuration, the HP turbine 41 is aft of the LP turbine 21, and forward of the combustor 13. The HP compressor 42 is aft of the combustor 13, and forward of the LP compressor 22. From this arrangement of the HP turbine 41 and the HP compressor 42, it can be appreciated that during operation of the engine 10, the LP compressor 22 driven by the LP turbine 21 feeds pressurized air to the HP compressor 42. Therefore, the pressurized air flow produced by the LP compressor 22 is provided to the HP compressor 42 and contributes to the work of both the LP turbine 21 and the HP turbine 41. This arrangement provides for a boosted reverse flow engine.

It can thus be appreciated that the presence of the above-described LP and HP spools 20, 40 provides the engine 10 with a "split compressor" arrangement. More particularly, some of the work required to compress the incoming air is transferred from the HP compressor 42 to the LP compressor 22. In other words, some of the compression work is transferred from the HP turbine 41 to the more efficient LP turbine 21. This transfer of work may contribute to higher pressure ratios while maintaining a relatively small number of rotors. In a particular embodiment, higher pressure ratios allow for higher power density, better engine specific fuel consumption (SFC), and a lower turbine inlet temperature (sometimes referred to as "T4") for a given power. These factors can contribute to a lower overall weight for the engine 10. The transfer of compression work from the HP compressor 42 to the LP compressor 22 contrasts with some conventional reverse-flow engines, in which the high pressure compressor (and thus the high pressure turbine) perform all of the compression work.

In light of the preceding, it can be appreciated that the LP turbine 21 is the "low-speed" and "low pressure" turbine section when compared to the HP turbine 41. The LP turbine 21 is sometimes referred to as the "power turbine". The turbine rotors of the HP turbine 41 spin at a higher rotational speed than the turbine rotors of the LP turbine 21 given the closer proximity of the HP turbine 41 to the outlet of the combustor 13. Consequently, the compressor rotors of the HP compressor 42 may rotate at a higher rotational speed than the compressor rotors of the LP compressor 22.

The HP turbine 41 and the HP compressor 42 can have any suitable mechanical arrangement to achieve the above-described split compressor functionality. For example, and as shown in FIG. 1, the HP shaft 43 extends concentrically about the LP shaft 23 and is independently rotatable relative thereto. The relative rotation between the HP shaft 43 and the LP shaft 23 allow the shafts 23, 43 to rotate at different rotational speeds, thereby allowing the HP compressor 42 and the LP compressor 22 to rotate at different rotational speeds. The HP shaft 43 can be mechanically supported by the LP shaft 23 using bearings or the like.

Still referring to the embodiment shown in FIG. 1, the engine 10 also includes an accessory gearbox (AGB) 50. The AGB 50 receives a rotational input from the HP spool 40 and, in turn, drives accessories (e.g. fuel pump, starter-generator, oil pump, scavenge pump, etc.) that contribute to the functionality of the engine 10. The AGB 50 can be designed with side-facing accessories, top-facing accessories, or rear-facing accessories depending on the installation needs.

According to the illustrated embodiment, the AGB 50 is concentrically mounted axially aft of the LP compressor 22 as an axial extension of the engine envelope. The axial positioning of the AGB 50 allows minimizing the overall radial envelope of the engine as compared to a split compressor or boosted engine having the AGB mounted on a side of the engine and connected to the HP spool via a tower shaft. In the illustrated embodiment, the AGB is accommodated within the envelope of the engine in a plane normal to the central axis 17.

Figure 2:
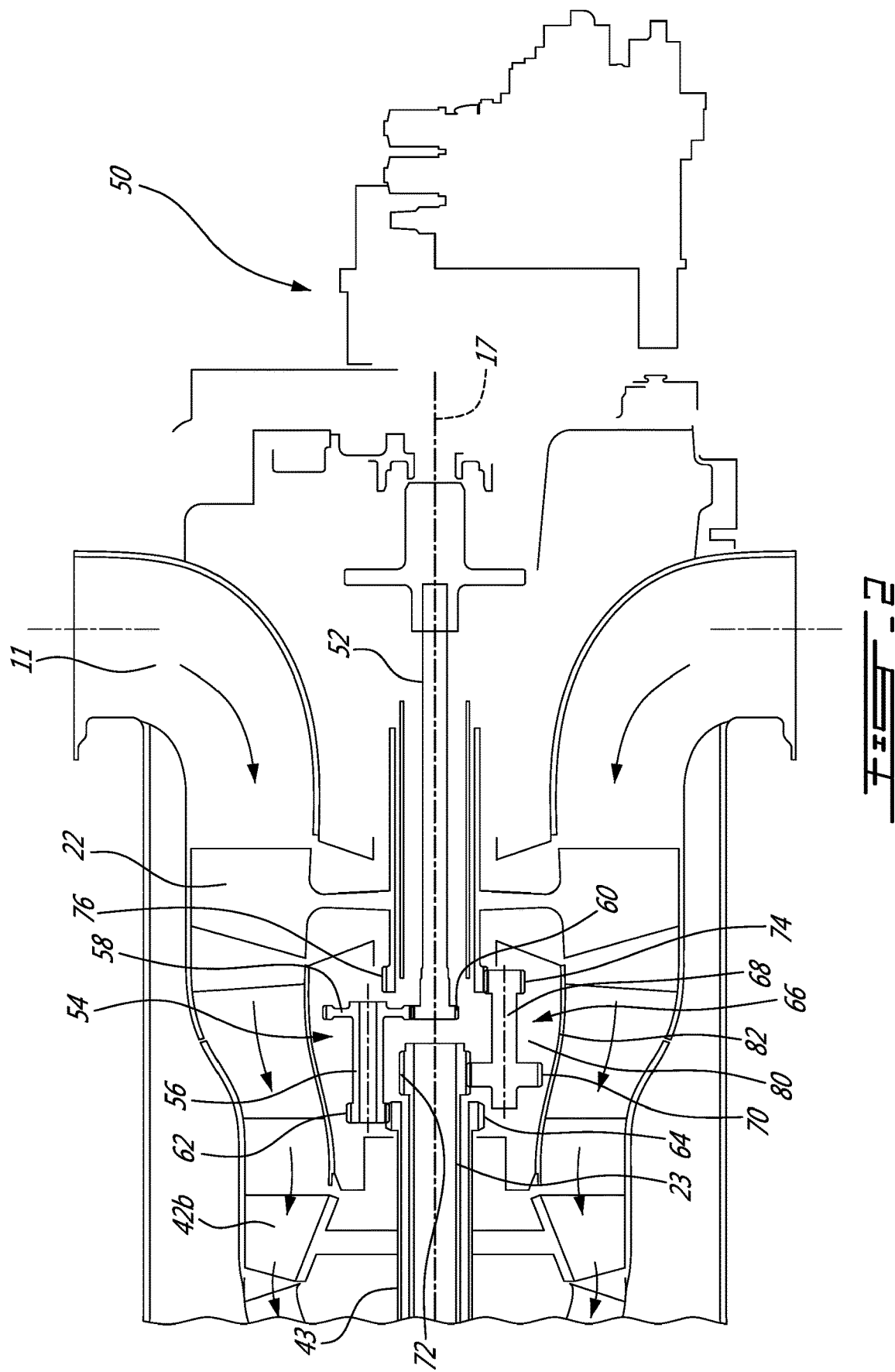
FIG. 2 is an enlarged cross-section of the engine shown in FIG. 1 and illustrating a gear driven low pressure (LP) compressor and an axially mounted accessory gearbox (AGB) driven through the center of the LP.

In the illustrated embodiment, the AGB input drive axis is coaxial to the LP compressor centerline and the engine central axis 17. By so aligning the input axis of the AGB 50 relative to the LP compressor centerline, the drive input to the AGB 50 can be provided centrally through the center of the LP compressor 22, thereby eliminating the need for a tower shaft and an externally mounted gear arrangement. However, unlike conventional reverse flow engines (like the well-known PT6 engine manufactured by Pratt & Whitney Canada), which do not include a compressor boost, the presence of the LP compressor 22 axially between the HP compressor 42 and the AGB 50 physically interferes with the connection of the AGB 50 with the HP spool 40. In the illustrated embodiment, this particular problem is overcome by passing the input drive shaft 52 of the AGB 50 centrally through the LP compressor 22. As best shown in FIG. 2, the AGB input shaft 52 extends along the engine central axis 17 through the central bore of the LP compressor 22. A first gear train 54 is provided for drivingly connecting the AGB input shaft 52 to the HP compressor 42. In the illustrated embodiment, the first gear train 54 comprises a geared shaft 56 having a first gear 58 in meshing engagement with a corresponding gear 60 at a distal end of the AGB drive shaft 52 and a second gear 62 in meshing engagement with a corresponding gear 64 at the rear end of the HP shaft 43 or HP compressor 42. To physically permit this gear drive connection between the AGB input shaft 52 and the HP spool 40 through the center of the LP compressor 22, a discontinuity between the LP shaft 23 and the LP compressor 22 is provided and the LP shaft 23 is drivingly connected to the LP compressor 22 via a second gear train 66. Indeed, if the LP shaft 23 was to extend continuously to the LP compressor 22, the AGB input shaft 52 could not be geared to the geared shaft 56, which is disposed radially outwardly relative to the LP shaft 23.

According to the illustrated embodiment, the second gear train 66 comprises a geared shaft 68 comprising a first gear 70 in meshing engagement with a corresponding gear 72 at the rear end of the LP shaft 23 and a second gear 74 in meshing engagement with a corresponding gear 76 on a hub portion projecting axially forwardly from the LP compressor 22. As mentioned herein above, the gear connection between the LP turbine 21 and the LP compressor 22 is also advantageous in that it allows to drive the LP compressor at a different speed than the LP turbine. It can thus allow for overall thermodynamic cycle performance improvement.

According to the illustrated embodiment, the first and second gear trains 54 and 66 are contained in a central cavity 80 radially inwardly of the gaspath 18 axially between the HP and LP compressors 42 and 22. The central cavity 80 is bounded by the compressor inner gaspath wall 82. This provides for a compact arrangement.

It is understood that the first and second gear trains 54, 66 could adopt various configurations. The configuration illustrated in FIGS. 1 and 2 is given for illustrative purposes only. For instance, as shown in FIG. 3, the gear train 66' between the LP shaft 23 and the LP compressor 22 could comprise additional gears to provide a desired gear ratio between the LP turbine 21 and the LP compressor 22. According to the illustrated alternative, the gear train 66' comprises first and second geared shafts 68a, 68b in meshing engagement with an intermediate gear 69. The first gear shaft 68a is provided with a first gear 70' at a first end thereof in meshing engagement with a gear 72' at the rear end of the LP shaft 23 and a second gear 74' in meshing engagement with the intermediate gear 69. The second gear shaft 68b has a first gear 71 in meshing engagement with the intermediate gear 69 and a second gear 73 in meshing engagement with a gear 76' on the LP compressor 22.

Also according to a non-illustrated alternative, the HP shaft 43 could extend centrally through the LP compressor 22 directly into the AGB 50. In this embodiment, the AGB input shaft 52 could be viewed as part of the HP shaft 43. The end of the HP shaft 43 would carry a gear in meshing engagement with a corresponding gear at the AGB input end. According to such an embodiment, the LP shaft 23 could also be extended axially rearwardly through the LP compressor 22 and the gear train between the LP shaft 23 and the LP compressor 22 could be provided within the AGB 50 aft of the LP compressor 22.

It can thus be appreciated that at least some of the embodiments of the engine 10 disclosed herein provide a mechanical architecture of turbomachinery that allows for a split compressor system in a compact PT6 type configuration. Such a split compressor engine in a reverse flow or through flow configuration may be used for aircraft nose installations, as well as for wing installations.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A multi-spool gas turbine engine comprising: a low pressure (LP) spool; a high pressure (HP) spool, the LP spool and the HP spool being independently rotatable from one another about a central axis, the LP pressure spool comprising an LP compressor and an LP turbine, the HP spool comprising an HP turbine and an HP compressor; and an accessory gear box (AGB) mounted in axial series at one end of the engine, the LP compressor being positioned between the HP compressor and the AGB, the AGB being drivingly connected to the HP spool through the center of the LP compressor, wherein the engine is an aircraft engine having a reverse flow configuration including an air inlet disposed aft of the LP compressor along a direction of travel of the aircraft engine, and wherein the AGB is disposed aft of the air inlet.

2. The multi-spool gas turbine engine defined in claim 1, wherein the AGB has an input shaft, the input shaft extending along the central axis through a central bore of the LP compressor.

3. The multi-spool gas turbine engine defined in claim 2, wherein the input shaft of the AGB is drivingly connected to the HP compressor via a gear train, the gear train being positioned axially between the HP compressor and the LP compressor.

4. The multi-spool gas turbine engine defined in claim 3, wherein the gear train is disposed radially inwardly from a gas path of the engine.

5. The multi-spool gas turbine engine defined in claim 1, wherein the LP turbine is drivingly connected to an LP shaft, which is, in turn, drivingly connected to the LP compressor via a gear train.

6. The multi-spool gas turbine engine defined in claim 5, wherein the gear train drivingly connecting the LP shaft to the LP compressor is positioned axially between the HP compressor and the LP compressor.

7. The multi-spool gas turbine engine defined in claim 5, wherein a gear ratio of the gear train is selected to rotate the LP compressor at a different speed than the LP turbine.

8. The multi-spool engine defined in claim 1, wherein the aircraft engine is a turboprop engine including a propeller mounted at the front end of the engine, the propeller being driven by the LP turbine via a reduction gear box.

9. A multi-spool gas turbine engine comprising: a low pressure (LP) spool; a high pressure (HP) spool; the LP spool and the HP spool being mounted for rotation about a central axis; the LP pressure spool comprising an LP compressor and an LP turbine, the HP spool comprising an HP turbine and an HP compressor; and an accessory gear box (AGB) drivingly connected to the HP spool, the LP compressor being axially positioned between the HP compressor and the AGB and drivingly connected to the LP turbine via a gear train, wherein the AGB has a drive input shaft extending along the central axis through a central bore of the LP compressor, the drive input shaft being drivingly connected to the HP spool, wherein the LP turbine is drivingly mounted to an LP shaft extending axially along the central axis within an HP shaft connecting the HP turbine to the HP compressor, the LP shaft having one end thereof projecting axially out of the HP shaft, said gear train being provided at said one end of the LP shaft.

10. The multi-spool gas turbine engine defined in claim 9, wherein the gear train is positioned axially between the HP compressor and the LP compressor.

11. The multi-spool gas turbine engine defined in claim 9, wherein the gear train is contained within a central cavity circumscribed by a compressor inner gaspath wall between the HP compressor and the LP compressor.

12. The multi-spool gas turbine engine defined 10, wherein the gear train comprises a first gear mounted to said one end of the LP shaft, said first gear being in meshing engagement with a second gear provided at a first end of a transfer shaft, a third gear provided at a second end of the transfer shaft, and a fourth gear provided on said LP compressor, the fourth gear being in meshing engagement with the third gear.

13. The multi-spool gas turbine engine defined in claim 9, wherein the engine is an aircraft engine, and wherein the AGB is aft of the LP compressor along a direction of travel of the aircraft engine, the LP compressor is aft of the HP compressor, the HP compressor is aft of the HP turbine, the HP turbine is aft of the LP turbine, and wherein the LP turbine is drivingly connected to an output drive shaft having a front end configured to drivingly engaged a rotatable load, the LP turbine being aft of the front end of the output drive shaft.

14. A turboprop or turboshaft engine comprising: an output drive shaft configured to drivingly engage a rotatable load; a low pressure (LP) spool comprising an LP turbine and an LP compressor, the output drive shaft being drivingly connected to the LP turbine, the LP compressor being drivingly connected to the LP turbine via a first gear train; a high pressure (HP) spool rotatable independently of the LP spool, and an accessory gearbox (AGB) drivingly connected to the HP compressor, the LP compressor being positioned axially between the AGB and the HP compressor, and wherein the AGB has an input axis coaxial to a centerline of the LP compressor, wherein the AGB has an input drive shaft extending axially through a central bore of the LP compressor, the input drive shaft being drivingly connected to the HP compressor via a second gear train.

15. The turboprop or turbofan engine defined in claim 14, wherein the first gear train is axially positioned between the HP compressor and the LP compressor radially inwardly of a gaspath fluidly interconnecting the HP compressor to the LP compressor.

16. The turboprop or turbofan engine defined in claim 14, wherein the first and second gear trains are contained in a common cavity circumscribed by a compressor inner gaspath wall.

17. A reverse flow gas turbine engine, comprising:
an output drive shaft having a front end configurable to drivingly engage a rotatable load;
a low pressure (LP) spool including an LP turbine drivingly engaged to the output drive shaft, and an LP compressor drivingly connected to the LP turbine via a gear train for rotation about a centerline;
a high pressure HP spool including an HP turbine and an HP compressor drivingly engaged to an HP shaft rotatable independently of the LP spool, the HP compressor in fluid communication with the LP compressor, and the HP turbine in fluid communication with the LP turbine; and
an accessory gearbox (AGB) having an input axis coaxial to the centerline, wherein the AGB has a drive input shaft extending along the centerline through a central bore of the LP compressor, the drive input shaft being drivingly connected to the HP spool.

18. The reverse flow gas turbine engine defined in claim 17, wherein the gear train is contained within a central cavity circumscribed by a compressor inner gaspath wall.

* * * * *